United States Patent [19]

Ikeda et al.

[11] Patent Number: 4,931,709
[45] Date of Patent: Jun. 5, 1990

[54] NC UNIT PROCESSING METHOD

[75] Inventors: Yoshiaki Ikeda; Mitsuru Kuwasawa, both of Tokyo, Japan

[73] Assignee: Fanuc Ltd., Minamitsuru, Japan

[21] Appl. No.: 141,598

[22] PCT Filed: Apr. 6, 1987

[86] PCT No.: PCT/JP87/00212

§ 371 Date: Dec. 3, 1987

§ 102(e) Date: Dec. 3, 1987

[87] PCT Pub. No.: WO87/06363

PCT Pub. Date: Oct. 22, 1987

[30] Foreign Application Priority Data

Apr. 7, 1986 [JP] Japan ............................. 61-079557

[51] Int. Cl.$^5$ ............................................. G05B 19/10
[52] U.S. Cl. ................................... 318/567; 318/562; 318/568.1; 364/140; 364/231.4
[58] Field of Search ................................. 318/560–566, 318/567–569, 568, 562, 568.11, 568.12, 568.13; 364/140, 146, 162, 171, 188–191, 474, 167.01, 230–230.3, 231.4, 231.6, 270–270.4, 270.6, 271, 373

[56] References Cited

U.S. PATENT DOCUMENTS 3,878,983 4/1975 Hamill et al. ....................... 318/569
4,029,950 6/1977 Haga .................................. 318/569
4,214,309 7/1980 Koida et al. ....................... 318/573

OTHER PUBLICATIONS

Tanenbaum, Andrew, *Structural Computer Organization*, 1984, pp. 263-269.

Primary Examiner—William M. Shoop, Jr.
Assistant Examiner—David Martin
Attorney, Agent, or Firm—Staas & Halsey

[57] ABSTRACT

An NC unit processing method executes numerical control processing based on a numerical control program and sequence control processing based on a sequence program at predetermined times on a time-sharing basis. The processing method first stores a location of a sequence program to be executed next in a predetermined storage area in response to a first timer interrupt ($IRQ_{n+1}$) generated during execution of the sequence program. Input/output processing based on an input/output program is then executed, followed by numerical control processing based on the numerical control program in response to a second timer interrupt ($IRQ_n$) generated during execution of the input/output processing. When the numerical control program ends, the execution location of the sequence program is referred to, and sequence program processing is executed from this location until the first timer interrupt ($IRQ_n$) is once again generated.

2 Claims, 4 Drawing Sheets

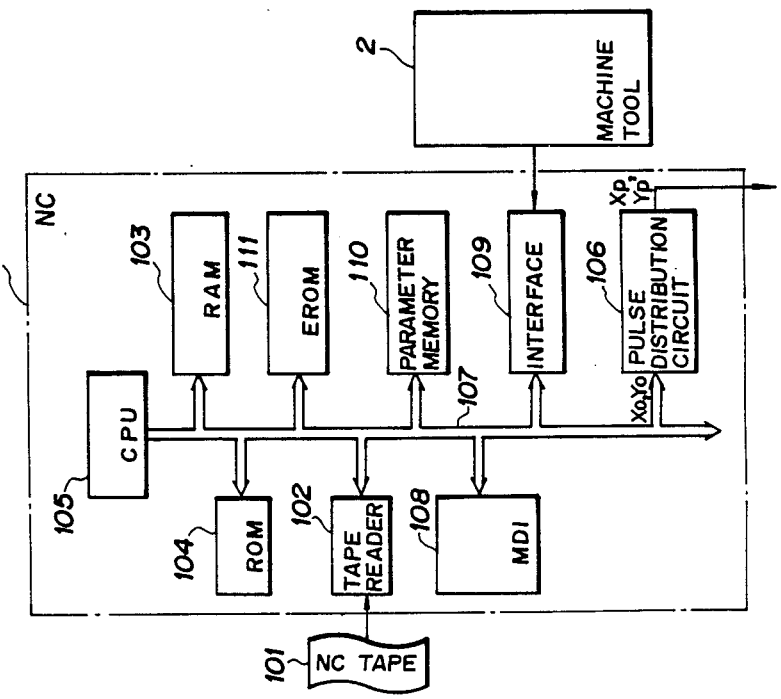

NC UNIT PROCESSING METHOD

BACKGROUND OF THE INVENTION

1. Field of the Invention

This invention relates to a numerical control (NC) method and, more particularly, to an NC unit processing method through which a single processor executes numerical control processing based on a numerical control program and sequence control processing based on a sequence program at predetermined times on a time-sharing basis.

2. Description of the Related Art

In a numerical control system, the processor of the NC unit (1) executes numerical control processing under the control of a numerical control program based on NC data (part program data) to transport a movable machine element (a tool or table), and (2) executes sequence processing under the control of a sequence program in accordance with M-, S- and T-function instructions which perform miscellaneous, spindle speed and tool selection functions, respectively, are contained in the NC data and contact signals from a machine tool to control the various mechanical elements of the machine tool on the basis of the results of this processing.

The processor executes the numerical control processing based on the numerical control program and the sequence control processing based on the sequence program at predetermined times on a time-sharing basis. FIG. 5 is a block diagram of an NC unit in which a single processor executes numerical control processing and sequence program processing on a time-sharing basis. Numeral 1 denotes the NC unit, and numeral 2 designates a machine tool.

Numeral 101 denotes an NC tape in which NC data (part program data) are punched, 102 a tape reader (though another medium and reading device may be used), 103 a RAM for storing the NC data punched in the NC tape 101 as well as the results of processing, 104 a ROM in which a numerical control program has been stored, 105 a processor (CPU), 106 a pulse distributing circuit for executing pulse distribution computations upon having amounts of travel $X_0$, $Y_0$ along the respective axes per predetermined lengths of time inputted thereto, 107 a bus line, 108 a manual data input unit (MDI unit), 109 an interface circuit, 110 a parameter memory for storing various parameters, and 111 an EROM (erasable ROM). The EROM 111 stores (a) a sequence program and (b) a correspondence table of correspondence between symbols (operands) and storage locations in the RAM 103 at which the logic values ("1" or "0") of these operands are stored.

The sequence program is one in which the functions of a magnetics circuit that administers the exchange of data between the NC unit 1 and machine tool 2 are programmed logically in the form of instruction codes and operands. The functions are programmed as shown in FIG. 6, by way of example. In the sequence program, RD, OR, AND, WRT, AND NOT, OR NOT and so forth are instruction codes, in which RD is a read instruction, AND a logical product instruction, WRT a write instruction, OR a logical sum instruction, AND NOT an instruction of a logical product with a negative value, and OR NOT an instruction of a logical sum with a negative value. Further, MF, M28, ..., AUT, M03, ... CRA are operands expressed by symbols, the logic values ("1" or "0") of which are stored at predetermined addresses and predetermined bits of the RAM 103.

The processor 105 executes numerical control processing based on the numerical control program and sequence control processing based on the sequence program at predetermined times on a time-sharing basis. In sequence control processing, the instructions of the sequence program are executed successively starting from the first instruction.

The larger the system, e.g. the larger the number of controlled axes, the longer the time required for numerical control processing. For this reason, the conventional practice is to decide a time $T_1$ for execution of numerical control processing and a time $T_2$ for execution of sequence processing upon presupposing the size of the largest system, and execute the numerical control processing ($T_1$) and sequence processing ($T_2$) on this time-sharing basis every predetermined time $T$ ($T > T_1 + T_2$).

With this method of processing, however, the length of time $T_2$ for execution of sequence processing is fixed even if the time required for numerical control processing is shortened by reducing the size of the system. The problem that results is that the processor is not used efficiently.

SUMMARY OF THE INVENTION

Accordingly, an object of the present invention is to provide an NC unit processing method so adapted that numerical control processing time and sequence processing time can be varied in dependence upon the system configuration.

The present invention provides an NC unit processing method for executing numerical control processing based on a numerical control program and sequence control processing based on a sequence program at predetermined times on a time-sharing basis. The processing method includes storing a location of a sequence program to be executed next in a predetermined storage area in response to a first timer interrupt generated during execution of the sequence program, executing input/output processing, executing numerical control processing based on the numerical control program in response to a second timer interrupt generated during execution of the input/output processing, referring to the location of the sequence program when numerical control processing ends, and executing sequence program processing from this position until the first timer interrupt is generated. Further, processing based on the input/output program is executed after processing of the sequence program is suspended. This input/output processing is suspended in response to a second timer interrupt, at which point numerical processing is executed based on the numerical control program.

Also according to the present invention, the NC unit processing method includes first inserting a command which refers to a location of a sequence program to be executed at the end of a numerical control program, generating a first timer interrupt, executing numerical control processing based on the numerical control program in response to the first timer interrupt, referring to the location of the sequence program by the command when the numerical control processing based on the numerical control program ends, executing sequence program processing from the location until a second timer interrupt is generated, generating a second timer interrupt upon passage of a fixed time from generation of the first timer interrupt, storing the location of the sequence program to be executed next in a predetermined storage area in response to the second timer interrupt, executing input/output programming based on the input/output program after processing of the sequence program is suspended, generating the first timer interrupt after passage of a fixed period from the previous generation of the first timer interrupt, suspending input/output processing in response to the first timer interrupt, and thereafter repeating numerical control processing, sequence control processing and input/output processing.

BRIEF DESCRIPTION OF THE DRAWINGS

FIGS. 5 and 6 are explanatory views of sequence processing.

DESCRIPTION OF THE PREFERRED EMBODIMENTS

Figure 1:
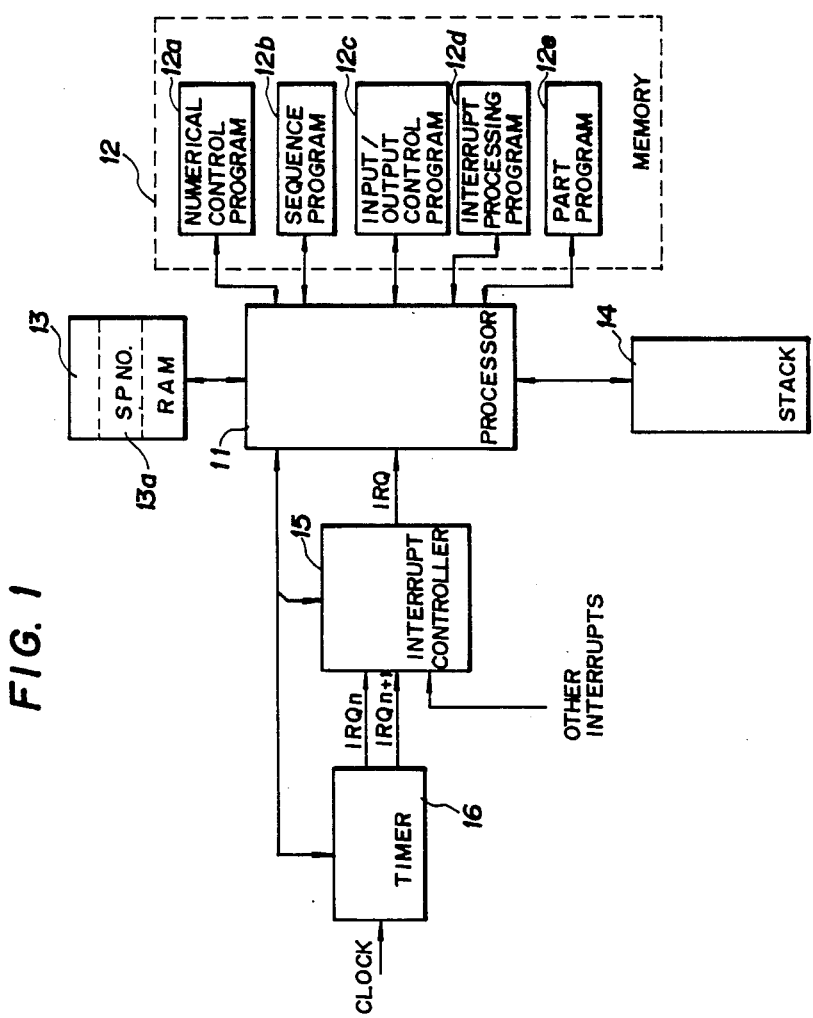
FIG. 1 is a block diagram showing the principal portions of an NC unit for practicing the processing method in accordance with the invention.

In FIG. 1, numeral 11 denotes a processor, 12 a memory for storing programs, 12a a numerical control program, 12b a sequence program, 12c an input/output control program for a CRT, keyboard and the like, 12d an interrupt processing program, 12e a part program, 13 a RAM, 14 a stack, 15 an interrupt controller, and 16 a timer. It should be noted that units necessary for NC control of an axis controller, CRT & MDI unit and the like are partially omitted.

Input/output control of the CRT, keyboard and the like and other processing which is permissible to be delayed are given a level (n−1), numerical control processing and sequence processing absolutely essential for such NC control as the reading of NC data and axis control are given a level n, processing from that of level n having the highest priority is given a level (n+1), a timer interrupt $IRQ_n$ for executing the processing of level n is denoted by $IRQ_n$, and an interrupt for executing the processing of level (n+1) is denoted by $IRQ_{n+1}$. The degree of priority is $IRQ_{n+1} > IRQ_n$.

Figure 2:
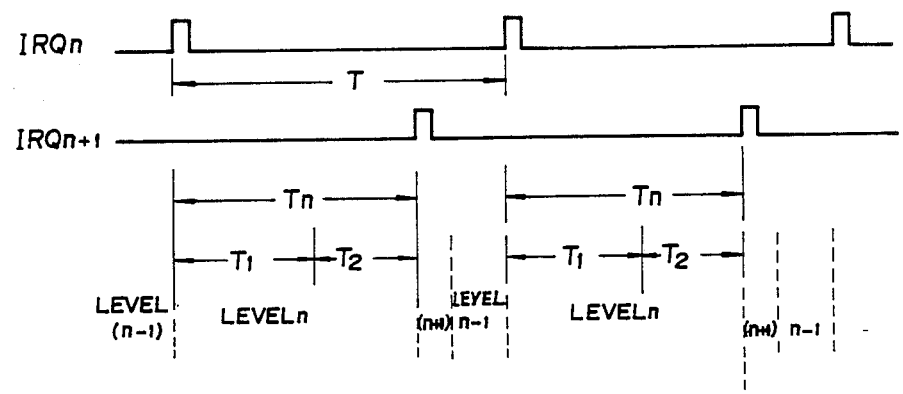
FIG. 2 is a time chart of timer interrupt processing.

As shown in FIG. 2, the timer interrupt $IRQ_n$ is generated at a period T (T is fixed), and the timer interrupt $IRQ_{n+1}$ is generated upon passage of a time $T_n$ (fixed) from generation of the timer interrupt $IRQ_n$.

At generation of the timer interrupt $IRQ_n$ while the processing of level (n−1) is being executed, the processor 11 executes the processing of level n until the timer interrupt $IRQ_{n+1}$ is generated. The processing of level (n+1) is executed in response to generation of the timer interrupt $IRQ_{n+1}$, and then the processing of level (n−1) is executed. It should be noted that the processing of level (n+1) is for causing the processor 11 to execute the, processing of level (n−1) at the conclusion of the processing of level n.

In the processing of level (n), the processor 11 first performs numerical control processing ($T_1$) under the control of the numerical control processing program 12a then performs sequence processing ($T_2$) under the control of the sequence program 12b. The numerical processing time $T_1$ is the total period of time necessary for numerical control processing and varies in dependence upon the system configuration. If the system configuration increases in size, then the numerical control processing time $T_1$ naturally becomes longer (the sequence processing time $T_2$ becomes shorter). If the system configuration decreases in size, then $T_1$ becomes shorter (the sequence processing time $T_2$ becomes longer).

(a) If the timer 16 generates the timer interrupt $IRQ_n$ when the processing of level (n−1) is being executed on the basis of the input/output control program 12c, the interrupt controller 15 inputs an interrupt request IRQ and the interrupt level (n) thereof to the processor 11.

(b) In response, the processor 11 executes predetermined interrupt processing under the control of the interrupt processing program 12d. More specifically, the contents of various registers and a program pointer indicative of location of the input/output program 12c to be executed later are successively stored in the stack 14 [see FIG. 3(A)].

(c) Next, the processor 11 executes numerical control processing ($T_1$) based on the numerical control program 12a.

(d) A command for referring to the contents of a predetermined address of the RAM 13 is included at the end of the numerical control program 12a. It should be noted that a location (program pointer) SPNO. of the sequence program 12b to be executed next is stored at the above-mentioned address, as will be described below. Accordingly, the processor 11 reads the program pointer SPNO. after the conclusion of numerical control processing.

(e) The processor 11 restarts sequence processing ($T_2$) in accordance with the sequence program 12b from the location indicated by the program pointer SPNO.

(f) Sequence processing is executed until the timer interrupt $IRQ_{n+1}$ is generated.

(g) If the timer interrupt $IRQ_{n+1}$ is generated by the timer 16 during the execution of sequence processing, the interupt controller 15 inputs the interrupt request IRQ and the interrupt level (n+1) thereof to the processor 11.

(h) In response, the processor 11 suspends sequence processing and stores the contents of various registers and a program pointer indicative of the location of the input/output program 12c to be executed later in the stack 14 [see n in FIG. 3(B)].

Figures 3A, 3B, 3C:
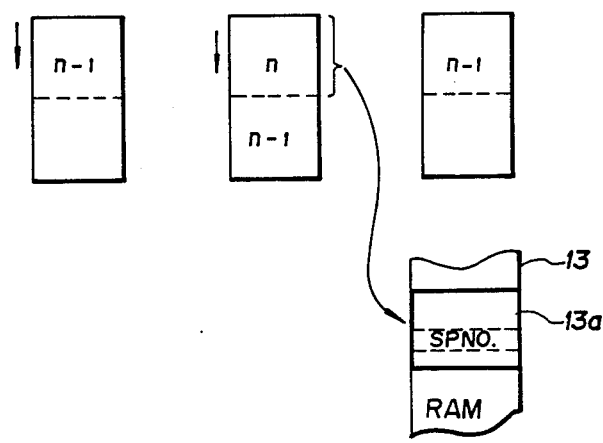
FIGS. 3(A), 3(B),3(C) and 4 are explanatory views of processing according to the invention.

(i) Thereafter, the processor 11 stores the saved data, which conforms to the level n, from the stack 14 in the predetermined storage area 13a of the RAM 13 [FIG. 3(C)].

(j) Next, the processor 11 cancels the interrupt flags of the timer interrupts $IRQ_n$, $IRQ_{n+1}$, restores the data conforming to the (n−1) level to the various registers from the stack 14, and returns to $IRQ_{n-1}$ to execute CRT display and key-in processing, etc., on the basis of the input/output program 12c.

Figure 4:
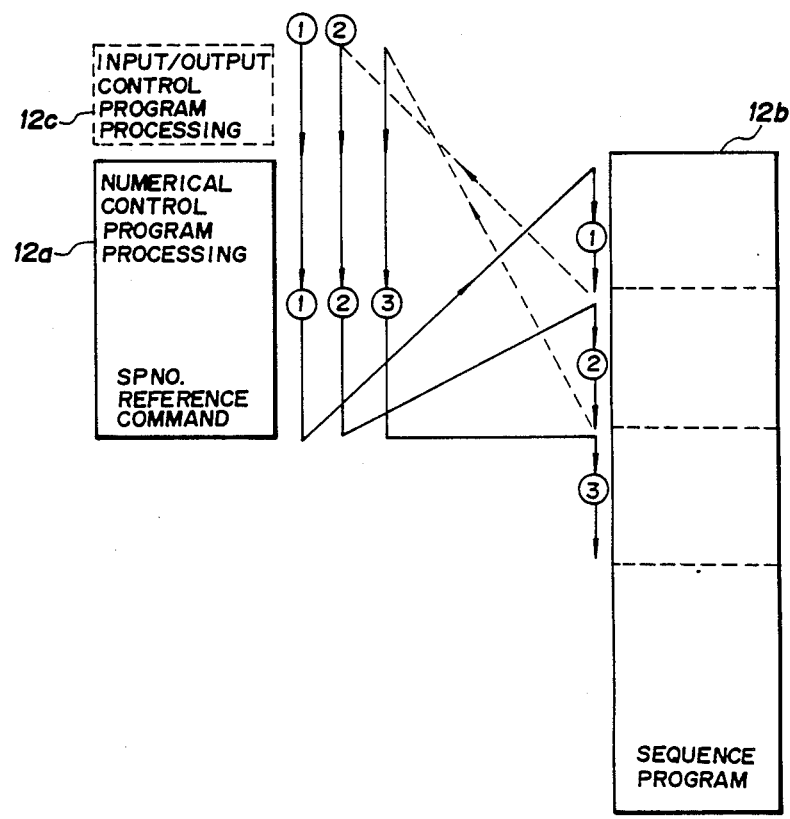

If the timer interrupt $IRQ_n$ is generated, processing from step (a) onward is repeated thereafter. Thus, as shown in FIG. 4, input/output control program processing→numerical control program processing→sequence program processing are executed sequentially in the order indicated by the numbered arrows.

Though a stack is used in the foregoing, a stack area can be provided in the RAM and stack pointers indicating read/write addresses can be prepared instead of using a stack.

Thus, in accordance with the present invention, the arrangement is such that a command for referring to the location of a sequence program to be executed next is inserted beforehand at the end of a numerical control processing program, and the processing executed shifts from numerical control processing to sequence processing in response to the command. Therefore, the time (numerical control processing time $T_1$) up to execution of the command varies in dependence upon the system configuration, so that the sequence processing time also varies accordingly. This makes it possible to improve the efficiency at which the processor is used.

We claim:

1. A numerical control unit processing method for executing numerical control processing based on a numerical control program, sequence processing based on a sequence program, and input/output processing based on an input/output program, comprising the steps of:
    (a) executing input/output processing based on the input/output program;
    (b) interrupting the input/output processing in response to a first timer interrupt;
    (c) storing a position of the input/output program in a first predetermined storage area;
    (d) executing numerical control processing based on the numerical control program;
    (e) executing sequence processing based on the sequence program after conclusion of the numerical control program;
    (f) interrupting the sequence processing upon generation of a second timer interrupt;
    (g) storing a position of the sequence program in a second predetermined storage area;
    (h) executing highest level processing to restore input/output processing based upon the position of the input/output program stored in step (c); and
    (i) repeating steps (a)-(h) with the sequence processing executed in step (e) starting at the position stored in step (g).

2. A numerical control unit processing method for executing numerical control processing based on a numerical control program, sequence control processing based on a sequence program and input/output processing based on an input/output program, comprising the steps of:
    (a) inserting a command transferring control to a location in the sequence program to be executed at the end of the numerical control program;
    (b) generating a first timer interrupt;
    (c) executing numerical control processing based on the numerical control program in response to the first timer interrupt;
    (d) transferring control to the location in the sequence program by said command when numerical control processing based on the numerical control program ends;
    (e) executing sequence program processing until a second timer interrupt is generated;
    (f) generating the second timer interrupt upon passage of a first fixed time from generation of the first timer interrupt;
    (g) storing the location of the sequence program to be executed next in a predetermined storage area, referred to by said command, in response to the second timer interrupt;
    (h) executing input/output processing based on the input/output program after completing step (g);
    (i) generating the first timer interrupt again after passage of a second fixed period from the previous generation of the first timer interrupt;
    (j) suspending the input/output processing in response to the first timer interrupt; and
    (k) repeating steps (c)-(j).

* * * * *